United States Patent [19]
Hardesty

[11] Patent Number: 5,027,605
[45] Date of Patent: Jul. 2, 1991

[54] OIL INJECTION SYSTEM FOR AIR CONDITIONING EQUIPMENT

[75] Inventor: Ronald C. Hardesty, Sykesville, Md.

[73] Assignee: Murray Corporation, Cockeysville, Md.

[21] Appl. No.: 525,234

[22] Filed: May 17, 1990

[51] Int. Cl.⁵ .......................................... F25B 45/00
[52] U.S. Cl. ...................................... 62/77; 62/292;
62/298; 62/468; 222/341; 222/383; 417/507; 417/549
[58] Field of Search ................... 62/77, 292, 298, 468; 222/341, 383; 417/507, 549

[56] References Cited
U.S. PATENT DOCUMENTS

| | | | |
|---|---|---|---|
| 2,575,870 | 11/1951 | Gates | 222/383 X |
| 2,650,744 | 9/1953 | Dirksen | 222/383 |
| 2,710,710 | 6/1955 | Brenholt | 222/341 |
| 3,016,022 | 1/1962 | Roth | 417/549 |
| 3,795,262 | 3/1974 | Post | 62/292 X |
| 3,935,713 | 2/1976 | Olson | 62/292 X |
| 3,996,765 | 12/1976 | Mullins | 62/292 |
| 4,460,152 | 7/1984 | DiPasquale et al. | 417/507 X |
| 4,467,620 | 8/1984 | Bradley et al. | 62/468 X |
| 4,535,802 | 8/1985 | Robertson | 62/292 X |

Primary Examiner—Lloyd L. King
Attorney, Agent, or Firm—Leonard Bloom

[57] ABSTRACT

An apparatus for dispensing a measured amount of hydroscopic lubricant into an air conditioning system. The apparatus includes a container for the lubricant which has a key type coupling to a cylinder. The cylinder has a piston which may reciprocate therein. The piston has a bore therethrough so that the lubricant may pass from the container and through the piston, and thereafter, through a hose and into the air conditioning system. The container has a seal to protect the lubricant from moisture, the seal being interrupted when the cylinder is coupled to the container. The cylinder has driven pins extending outwardly therefrom and the cylinder also has a pair of diametrically opposed slots therein. The piston has a pair of diametrically opposed drive pins thereon arranged so that the piston drive pins communicate with the slots in the cylinders. A detachable leveraged handle having arms joined in a scissor fashion is provided. The cylinder is received in the handle so that the drive pins on the cylinder and the drive pins piston are engaged by notches on the ends of the arms. Opening and closing the arms of the handle produces reciprocating movement of the piston within the cylinder. This movement pumps a controlled amount of lubricant through the apparatus. To prevent contamination of different incompatible lubricants, containers and cylinders are keyed in a manner such that the containers may not be used with incompatible cylinders and vice versa.

27 Claims, 10 Drawing Sheets

OIL INJECTION SYSTEM FOR AIR CONDITIONING EQUIPMENT

FIELD OF THE INVENTION

The present invention relates to an apparatus for dispensing a measured amount of lubricant into an air conditioning system. More particularly, the present invention relates to dispensing lubricants which are both hydroscopic (hydrophilic) and hygroscopic and are non-compatible with other lubricants.

BACKGROUND OF THE INVENTION

Most of the conventional lubricants currently used to lubricate the compressor in air conditioning systems, and particularly in automotive air conditioning systems, are naphtha-based and paraffin-based oils. All of these oils have additives to reduce foaming and to improve lubricity.

Due to environmental factors, the use of chlorinated fluorocarbons (CFC) as refrigerants is being curtailed. Some of the refrigerants which are replacing CFC are incompatible with the conventional lubricants. Therefore, new lubricants are being used. Among these new lubricants are the polyakyleneglycol (PAG) lubricants which also have additives. However, not all of the PAG lubricants, and their additives, are compatible with one another and it is highly probable that the manufacturers of air conditioning equipment will utilize different PAG lubricants in their air conditioners. This will cause problems for persons servicing the air conditioners since mixing of the PAG lubricants among themselves and/or with conventional lubricants, can cause system failure. A further complication in the use of the PAG lubricants is the extreme hydroscopicity of these compounds. The PAG lubricants cannot be dispensed from an open container in a conventional manner. The PAG lubricants must be maintained isolated from the air, and any source of moisture of water.

Therefore, apparatus for dispensing the PAG lubricants must have features which are not required for dispensing conventional lubricants.

A collapsible, accordion fold oil container attached directly to the input of a refrigeration system and adapted to be manually compressed is disclosed by U.S. Pat. No. 2,394,081 issued to Lawton. A portable hand pump for oiling is disclosed by U.S. Pat. No. 2,710,710 issued to Brenholt. U.S. Pat. No. 3,016,022 issued to Roth discloses a manually controlled pump having an internal toggle linkage. A valve assembly for an aerosol container is known in U.S. Pat. No. 3,441,177 issued to Treharne, Jr. U.S. Pat. No. 3,795,262 to Post discloses a manual pump used to inject fluid into a high pressure refrigeration system from a collapsible container. The pump includes check valves to prevent pressure from the refrigeration system from forcing refrigerant back into the fluid container. The sides of the flexible diaphragm are squeezed to provide the preferred method of forcing the fluid into the system. A dispensing pump having a reciprocal plunger is disclosed in U.S. Pat. No. 4,033,487 issued to Micallef. U.S. Pat. No. 4,159,067 issued to Akers discloses a dispensing pump for a container wherein the container can be shipped with the pump assembly attached and removal of the assembly from the container is inhibited. U.S. Pat. No. 4,467,620 to Bradley et al disclose a manual metering pump used to inject oil into the high pressure side of a refrigeration system. The pump includes a pump cylinder having a piston therein actuated by a piston rod. The chamber within pump cylinder containing oil communicates with a fitting through conduit, that attaches to a charging port on the high pressure side of a refrigeration system. The piston rod screw threadably engages the end of piston.

While a variety of dispensing apparatuses are known, none are capable of dispensing hydroscopic lubricants in measure quantities and also providing means to prevent non-compatible materials from being introduced into the air conditioning system at normal system pressures.

SUMMARY OF THE INVENTION

An object of the present invention is to provide a dispenser for lubricant which can protect hydroscopic, hydrophilic and hygroscopic materials from the atmosphere and other potential sources of contamination.

Another object of the present invention is to provide a dispenser for lubricant which prevents intermixing of non-compatible materials.

An additional object of the invention is to provide a dispenser for lubricant which can dispense a known amount of lubricant.

A further object of the invention is to provide a dispenser for lubricant having a piston within a cylinder and a means to move the piston within the cylinder.

A still further object of the invention is to provide a detachable leveraged device to move a piston within a cylinder.

Yet another object of the invention is to provide a collapsible container for lubricant which has a seal thereon and which can be selectively connected to a cooperating dispensing means.

Yet an additional object of the invention is to provide a set of lubricant apparatuses which prevents use of a designated container of lubricant with a non-designated dispensing means.

Yet a further object of the invention is to provide a method for dispensing a measured amount of lubricant into an air conditioning system.

In accordance with the teachings of the present invention, there is disclosed an apparatus for dispensing a measured amount of lubricant into an air conditioning system or the like, wherein the lubricant is substantially hydroscopic and tends to absorb moisture which, if introduced into the refrigerant, would cause premature failure of the air conditioning system. The lubricant contains additives which may substantially contaminate other additive-containing lubricants intended for refrigerant purposes. The apparatus includes a collapsible container for the lubricant. The container has a seal thereon such that the lubricant is not exposed to the atmosphere and thus cannot absorb moisture from the atmosphere. A pump means, including a cylinder having a reciprocatory piston therein, is provided. Also provided are means for connecting the pump means to the air conditioning system and means for coupling the cylinder to the container. The last-named coupling means includes means for interrupting the seal upon coupling the cylinder to the container. Means externally of the pump means are provided for reciprocating the piston so that the pump means will dispense a measured amount of the lubricant into the air conditioning system. The apparatus prevents inadvertent absorption of moisture by the lubricant or contamination of the lubricant by non-intended additives, and hence into the refrigerant, thereby preventing a consequent costly failure of the air conditioning system.

The invention can also be seen as an apparatus for dispensing a measured amount of fluid from a source of the fluid. The apparatus includes a cylinder having a first end, a second end and a midpoint. Means are provided for connecting the first end of the cylinder to the source of the fluid. A pair of slots extends longitudinally on the cylinder from approximately the midpoint toward the second end of the cylinder, the slots being on diametrically opposed sides of the cylinder. A reciprocating piston is received within the cylinder. The piston has a longitudinal bore therethrough. The first end of the cylinder has a first passage means therein to permit the fluid to pass from the source of the fluid into the cylinder. The longitudinal bore in the piston has a second passage means therein to permit fluid to pass from the piston. In this manner, the fluid may pass from the source of the fluid through the cylinder and through the piston. The piston further has a midpoint, and a pair of drive pins are attached to the piston at approximately the midpoint thereof. Each drive pin is attached on diametrically opposed sides of the piston such that when the piston is received within the cylinder, the drive pins on the piston communicate with the respective longitudinal slots in the cylinder. The drive pins on the piston extend outwardly through the respective longitudinal slots, such that when the piston reciprocates longitudinally within the cylinder, the longitudinal movement is limited by the drive pins on the piston extending from the longitudinal slots. The amount of fluid dispensed is thereby controlled. Means are also provided for reciprocating the piston within the cylinder.

From yet another viewpoint, the invention can be viewed as a detachable leveraged device for holding and moving a workpiece, the workpiece having a plurality of pins attached thereto. The device includes a pair of arms. Each arm has a first end and a second end. The arms are joined near the respective first ends by a pin for pivotal movement of the arms about the pin in a scissor-like movement. The second ends of the respective arms form respective handles. The first end of each arm is a bifurcated end. Each bifurcated end has a first edge and a second edge. Each first edge is spaced apart from each second edge such that the workpiece may be received between the respective edges of the respective bifurcated ends. Each first edge and each second edge further have a notch formed therein. When the workpiece is received between the respective edges of the respective bifurcated ends of the arms, the at least one pin attached to the workpiece is received in the notch in the edge of the one bifurcated end and the at least another pin attached to the workpiece is received in the notch in the edge of the other bifurcated end, thereby permitting holding of the workpiece and movement of the workpiece when the arms of the leveraged device are pivoted. The first end of each arm further has thereon means for locking the respective pins in the respective notches to prevent disengagement thereof when the workpiece is held and moved.

The invention can also be seen as a set of lubricant apparatuses for dispensing a measured amount of lubricant into an air conditioning system or the like. The lubricant is substantially hydroscopic and tends to absorb moisture which, if introduced into the refrigerant, would cause premature failure of the air conditioning system The lubricant contains additives which may substantially contaminate other additive-containing lubricants intended for refrigerant purposes. The set has a plurality of members. Each member of the set has a different designated lubricant which is used separately from the other members of the set. Each member of the set includes a respective collapsible container for the designated lubricant. Each container has a seal thereon, such that the lubricant is not exposed to the atmosphere and thus cannot absorb moisture from the atmosphere. A respective pump means is provided, including a cylinder having a reciprocatory piston therein. Means for connecting the respective pump means to the air conditioning system is provided. Means for coupling the respective cylinder to the respective container is provided. The last-named coupling means includes means for interrupting the respective seal upon coupling the respective cylinder to the respective container. Means are provided externally of each pump means for reciprocating the respective piston so that the respective pump means will dispense a measured amount of the designated lubricant into the air conditioning system. Means ar provided for keying the respective container of each member to the respective cylinder of said member. In this manner, a cylinder used with a respective designated lubricant is not inadvertently used with a container for another designated lubricant, and vice-versa. Thereby, the inadvertent absorption of moisture by the lubricant or contamination of the lubricant by non-intended additives, and a consequent costly failure of the air conditioning system, is prevented.

The present invention is also seen as a method for dispensing a measured amount of lubricant into an air conditioning system or the like.

These and other objects of the present invention will become apparent from a reading of the following specification, taken in conjunction with the enclosed drawings.

DETAILED DESCRIPTION OF THE PREFERRED EMBODIMENTS

Referring now to FIGS. 1-5, the apparatus 10 comprises a collapsible bag 11 which contains the lubricant L. The collapsible bag 11 has a coupling means such as a threaded cap 12 thereon. A pump means 15 is connected to the cap 12 on the bag 11 by means of a cooperating coupling means such as a threaded end cap 16. This end cap 16 may have a knurled outer surface for ease of connection. The pump means 15 includes a cylinder 17 having a reciprocating piston 18 therein. Means such as a detachable leveraged handle 20 is provided externally to the pump means 15 to move the reciprocating piston 18. A flare fitting 21 is connected to the piston 18. A coupling means 23 on the first end of a hose 24 is connected to the flare fitting 21. The second end of the hose 24 has a second coupling means 25 thereon for connection to the air conditioning system. This second coupling means may incorporate an anti-blow back valve 26 as a safety feature.

Figure 1:
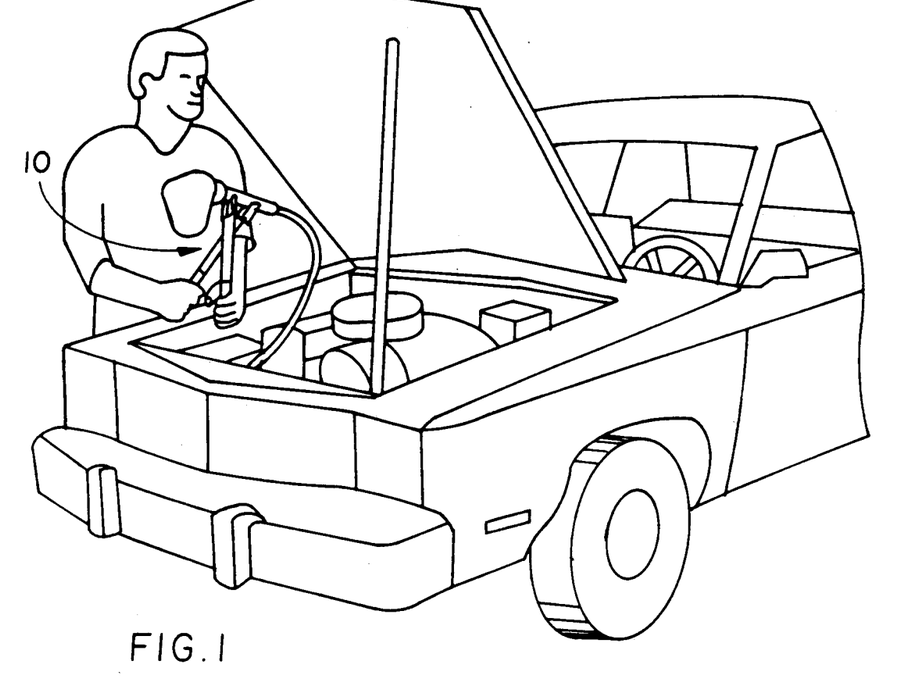
FIG. 1 is a perspective view of the present invention in a typical application.
Figure 2:
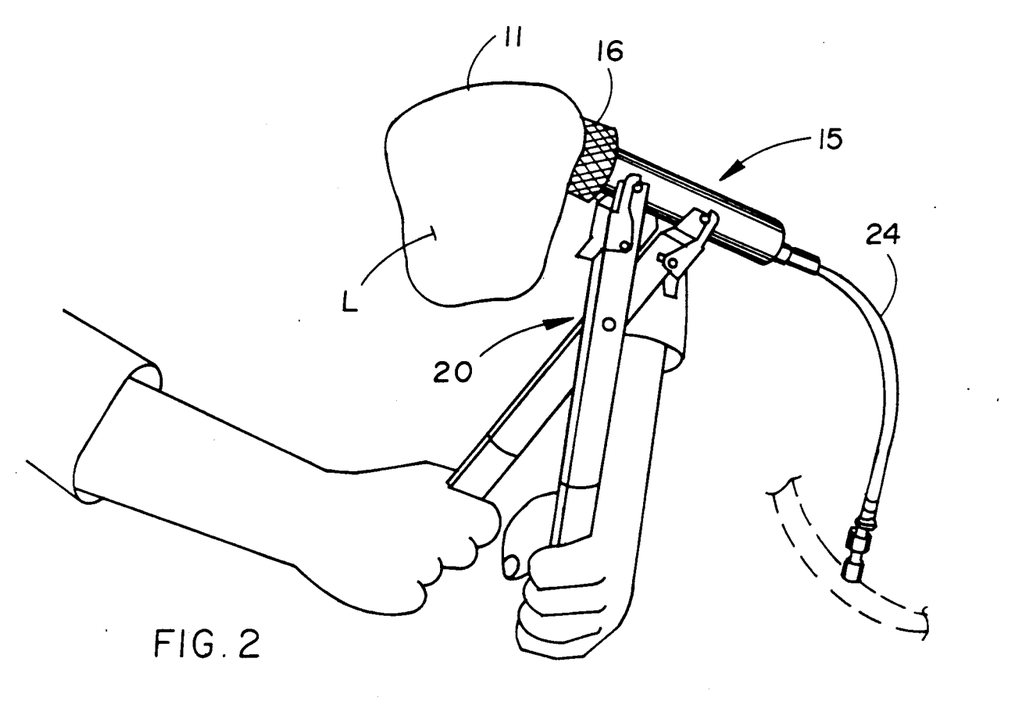
FIG. 2 is a perspective view of the present invention showing the leveraged handle attached thereto.
Figure 3:
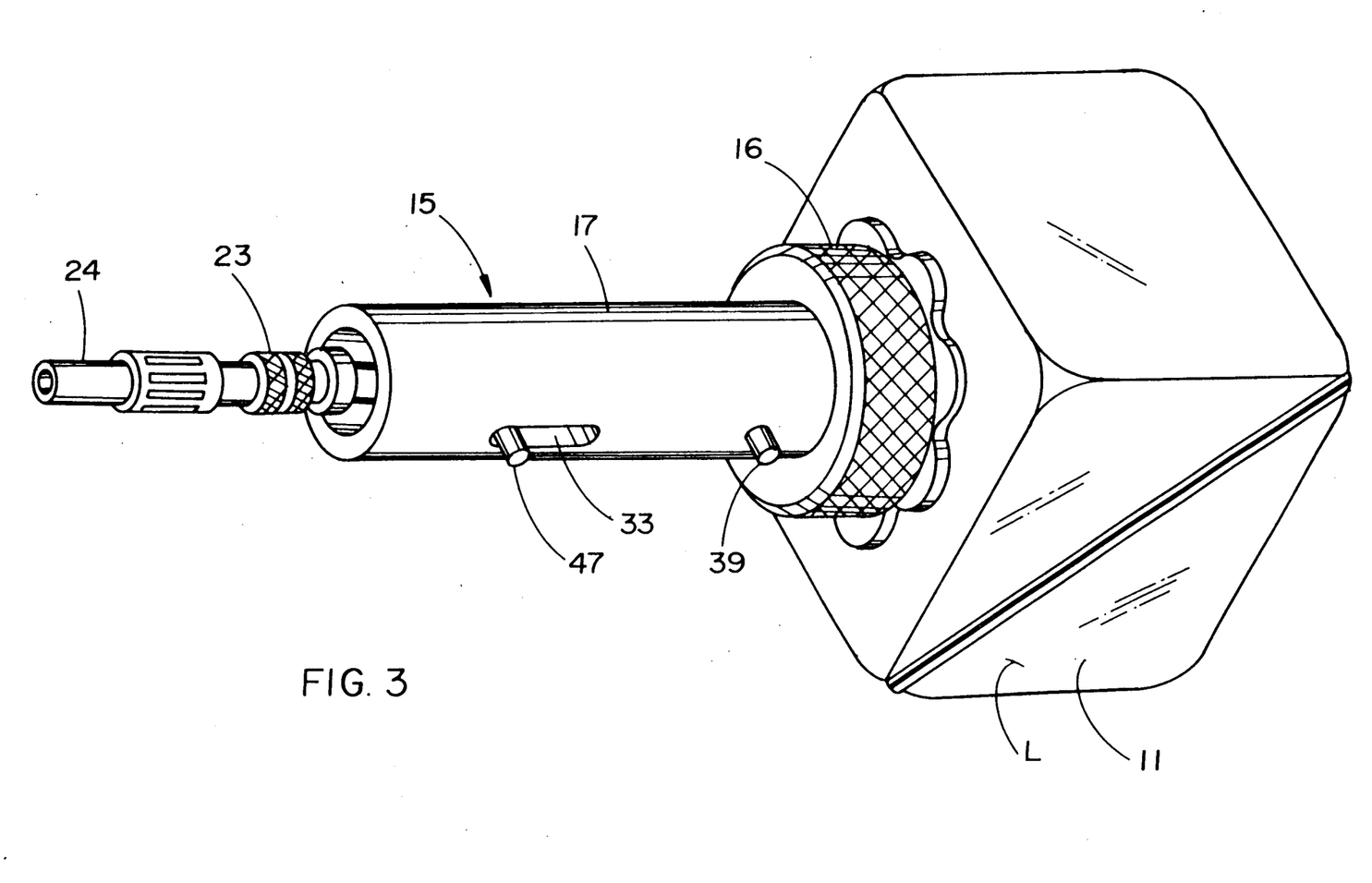
FIG. 3 is a perspective view of the present invention without the leveraged handle.
Figure 4:
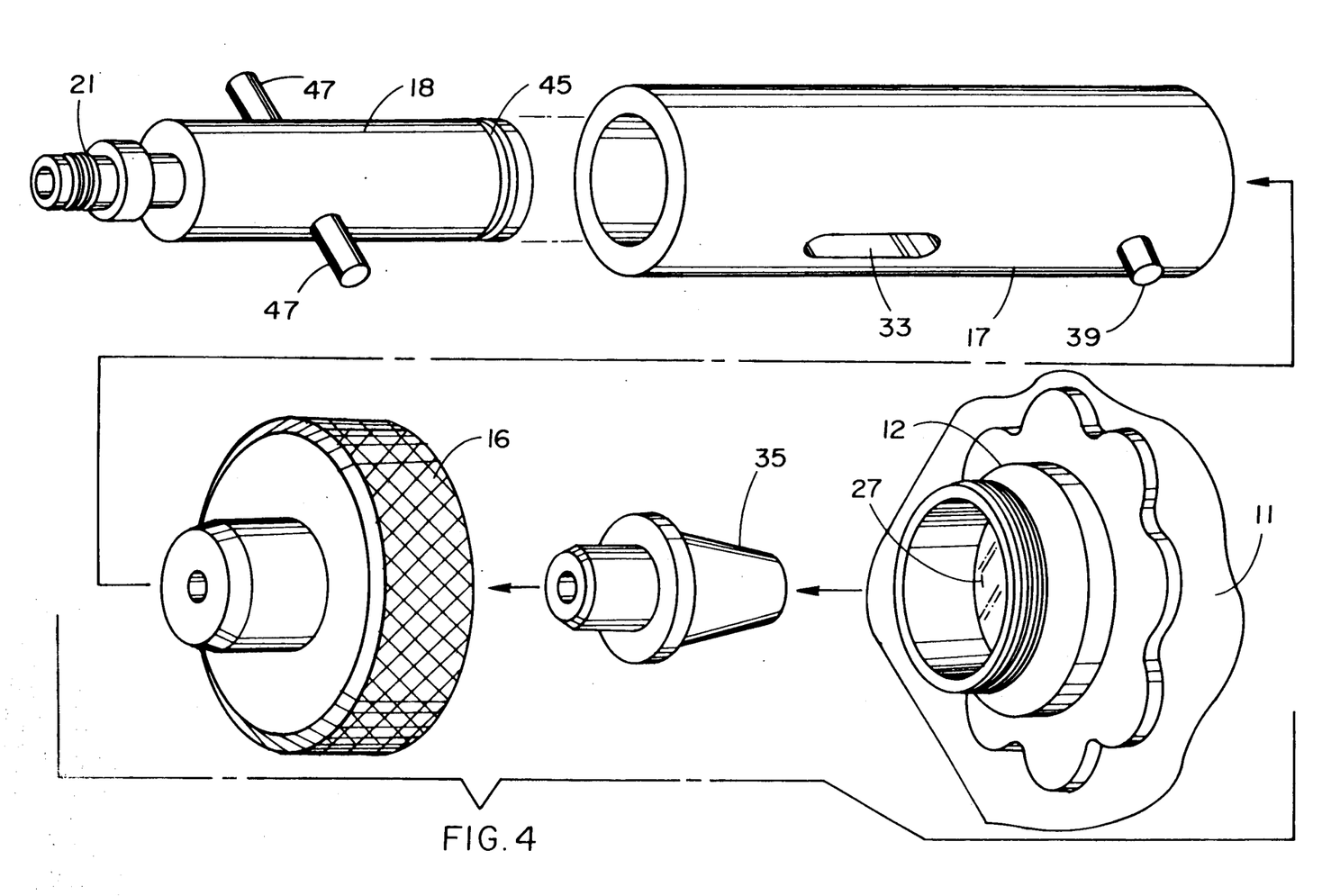
FIG. 4 is an exploded perspective view of the apparatus of the present invention.
Figure 5:
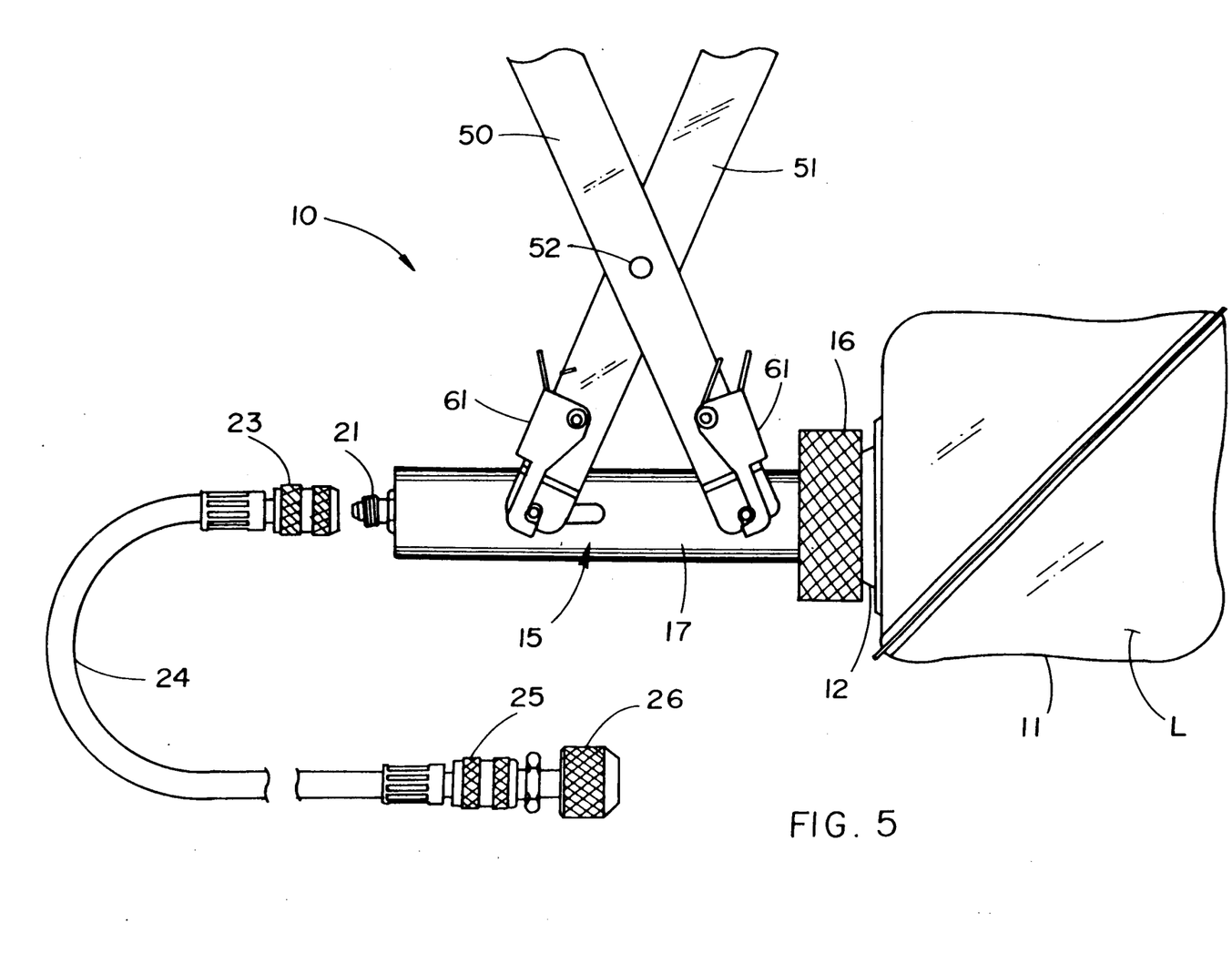
FIG. 5 is a side elevational view of the apparatus of the present invention.
Figure 6:
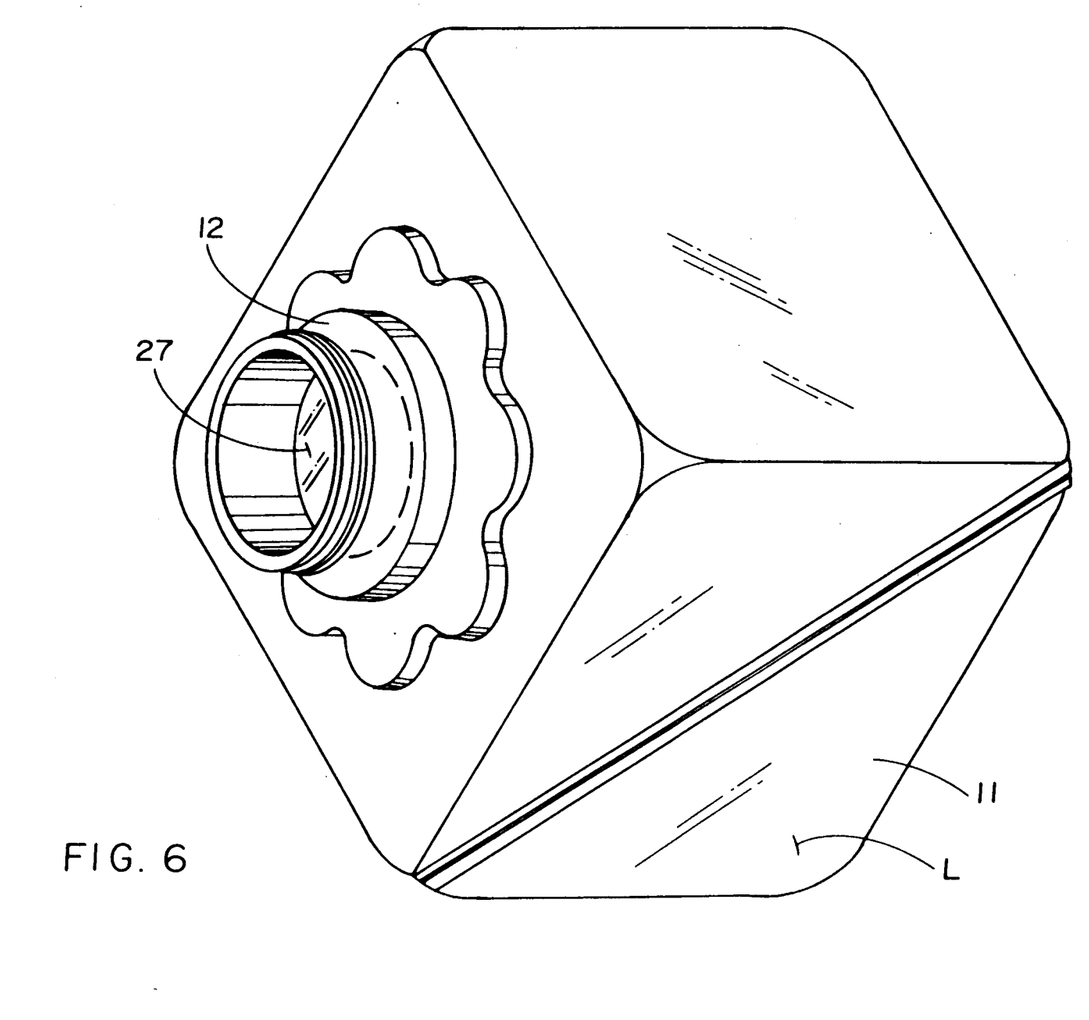
FIG. 6 is a perspective view of the container of the present invention showing the cap and seal therein.

In the preferred embodiment, the bag 11 is collapsible but rigid and semi-rigid containers could be used without affecting the utility of the apparatus. Also, in a preferred embodiment, the bag is made of a transparent material so that the user can readily determine the amount of lubricant remaining in the container. As more clearly shown in FIG. 6, the collapsible bag 11 has a closure 12 thereon. The closure 12 has a seal 29 thereon to prevent moisture from contacting the hydroscopic lubricant L which is contained in the bag 11. The type of seal is not critical. The seal must effectively prevent moisture from contacting the lubricant L and the seal must be easily interrupted, pierced or displaced when the pump means 15 is coupled to the bag 11. The closure 12 must also be of a type which may be keyed to the dispensing means to assure that the coupling is secure and also to permit the coupling of specific closures with specific dispensing means as will be described later. As shown in FIG. 6, the coupling means is a threaded cap 12 on the bag 11 and a cooperating threaded end 16 on the pump means 15. Changing of the pitch or the number of threads per unit length is one means of providing a keying means and of preventing interchangeability of lubricant containers and dispensing means. Other keying means such as bayonet couplings, keyways of varying dimensions, etc. may be used as are known to persons skilled in the art.

Figure 7:
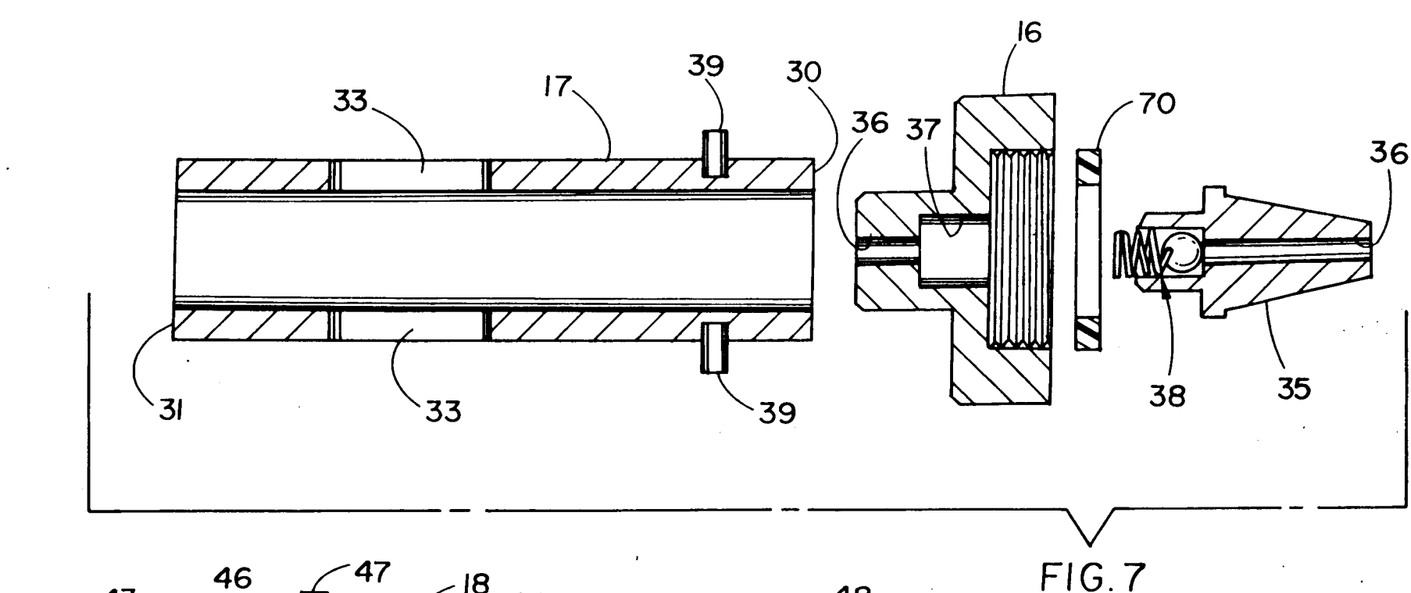
FIG. 7 is an exploded side elevational view of the cylinder of the present invention with partial sections taken thereof.

The cylinder 17, which is a component of the pump means 15 is shown in FIG. 7. The cylinder is a hollow tube having a first end 30 which is oriented toward the collapsible bag 11 and a second end 31 which is oriented toward the air conditioning system. At approximately the midpoint of the cylinder and extending toward the second end 31 of the cylinder 17 are a pair of slots 33. The slots 33 are on diametrically opposed sides of the cylinder 17. The length of the slots 33 is determined by the volume of lubricant to be dispensed as will be explained. Attached to the second end 31 of the cylinder 17 is a means to couple the cylinder 17 to the collapsible bag 11. As shown in FIG. 7, this means is a threaded cap 16 which has threads to cooperate with the threads on the cap 12 on the bag 11. As noted previously, other types of coupling means may be used. A protruding end 35 is fitted into the cap or on the cylinder 17; the protruding end extends outwardly from the cap 16. When the cap 16 on the cylinder 17 is coupled to the cap 12 on the bag 11, the protruding end 35 interrupts the seal 27 on the bag 11 to permit the lubricant L from the bag 11 to enter the pump means 15. The protruding end 35 and the cap 16 each have a central bore 36 therein. A section 37 of the bore 36 has a larger diameter than the remainder of the bore 36. In this enlarged section 37, there is disposed a first passage means 38 which, as shown, is a spring loaded check ball which acts as a one-way valve to permit entry of the lubricant L into the pump means 15 as will be detailed. A pair of drive pins 39 are attached on the outside of the cylinder 17 near the first end 30 of the cylinder 17. Each drive pin 39 is attached on diametrically opposed sides of the cylinder 17 and each drive pin 39 extends perpendicularly outwardly from the cylinder 17. Each drive pin 39 is in a longitudinal plane which corresponds with a longitudinal plane for each longitudinal slot 33 in the cylinder 17. In this manner, the pair of cylinder attached drive pins 39 are longitudinally aligned with the pair of longitudinal slots 33 on diametrically opposed sides of the cylinder 17.

Figure 8:
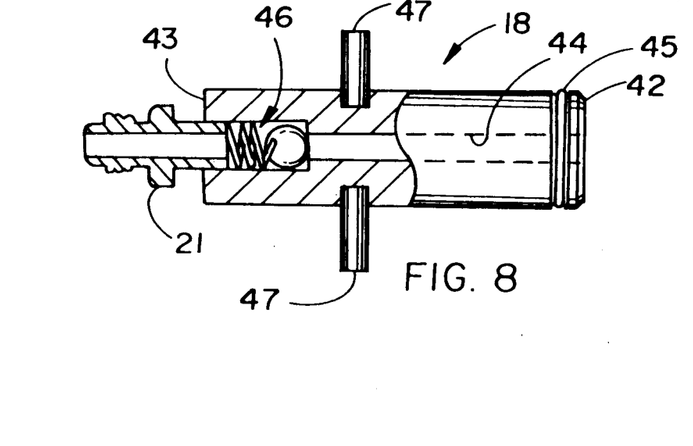
FIG. 8 is a side elevational view of the piston of the present invention showing a partial section thereof.
Figures 9A, 9B:
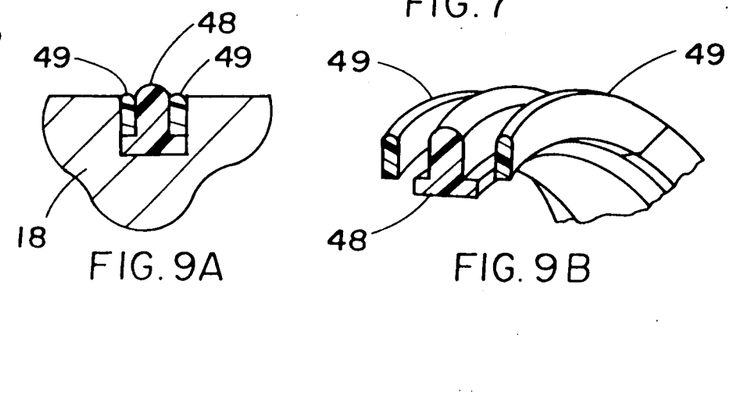
FIG. 9A is an enlarged cross section view of the sealant means in the groove in the piston.
FIG. 9B is a perspective view of the "T" seal.

FIG. 8 shows the reciprocating piston 18 which is disposed within the cylinder 17. The piston 18 has a first end 42 which is oriented toward the bag 11 containing the lubricant L and a second end 43 which is oriented toward the air conditioning system. The piston 18 has a longitudinal bore 44 therethrough, the bore 44 in the piston 18 communicates with the bore 36 in the first passage means 38 in the cylinder 17. In this manner, the lubricant L may pass from the first end of the cylinder 30 through the piston 18 and to the air conditioning system. The first end 42 of the piston 18 has at least one sealant means 45 thereabout such that a seal is made between the piston 18 and the cylinder 17. The sealant means 45 is preferably a "T" seal (FIGS. 9A-9B) which includes a "T" member 48 having the flange member of the "T" disposed at the base of the groove and having the center leg of the "T" extending outwardly in the groove in the first end 42 of the piston 18. A back-up ring 49 is disposed on each side of the center leg between the center leg and the respective walls of the groove in the first end 42 of the piston 18. The leg of the "T" member and the back-up rings 49 produce a seal with the inner wall of the cylinder 17. Other sealant means known to persons skilled in the art may be used. However, the preferred "T" seal means provides more accuracy and repeatability in metering the lubricant. The bore 44 in the second end 43 of the piston 18 has a diameter which is greater than the bore 44 throughout the greater length of the piston 18. A flare fitting 21 having a bore therein is attached to the second end 43 of the piston 18 such that the bore in the flare fitting 21 communicates with the bore 44 in the piston. A second passage means 46 is disposed in the enlarged bore 44 in the second end 43 of the piston 18 which, as shown, is a spring-loaded check ball. This spring-loaded check ball acts as a one-way valve to permit lubricant L to pass from the pump means 15. This will be detailed later.

The flare fitting 21 is coupled to the hose 24, which is in turn, coupled to the air conducting system. At approximately the midpoint of the piston 18, there are attached a pair of piston drive pins 47. These piston drive pins 47 extend perpendicularly outwardly from the piston 18 and are attached on diametrically opposed sides of the piston 18. The piston drive pins 47 are so mounted on the piston 18 that when the piston 18 is received in the cylinder 17, the piston drive pins 47 communicate with the longitudinal slots 33 in the cylinder 17. The piston drive pins 47 extend outwardly through the respective slots 33. The piston drive pins 37 are thereby in the same longitudinal plane 40 as the respective longitudinal slots 33 and the cylinder drive pins 39.

Although FIG. 8 shows the flare fitting 21 attached to the piston 18, it is also possible for the flare fitting 21 to be attached to the second end 31 of the cylinder 17. In this embodiment, the connection to the hose 24 and the air conditioning system are as described above.

Figure 10:
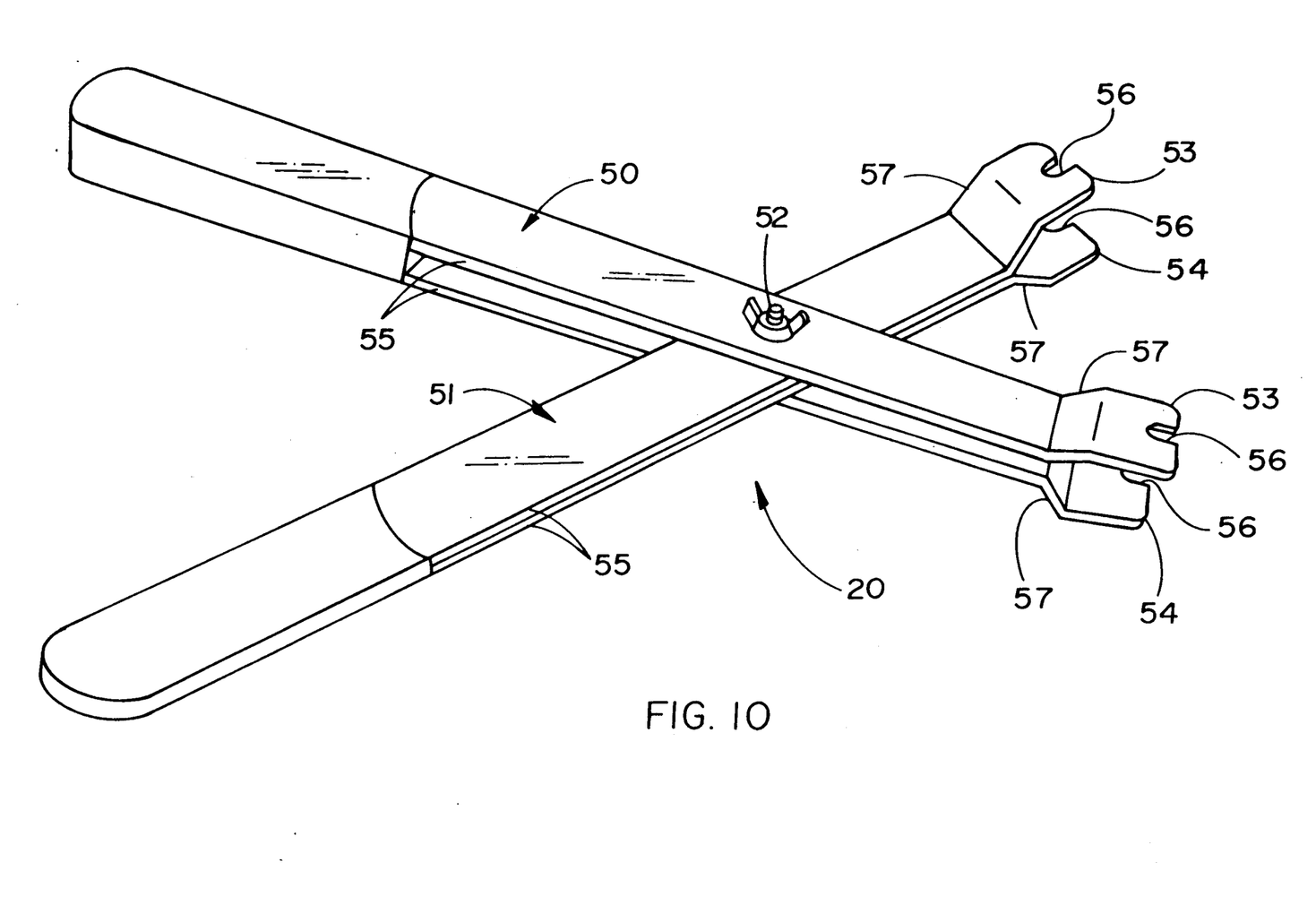
FIG. 10 is a perspective view of the detachable leveraged handle of the present invention in which the brackets have been omitted.
Figure 11:
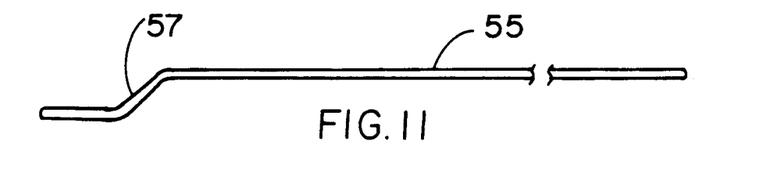
FIG. 11 is a side elevational view of a section of the handle of FIG. 10.
Figure 12:
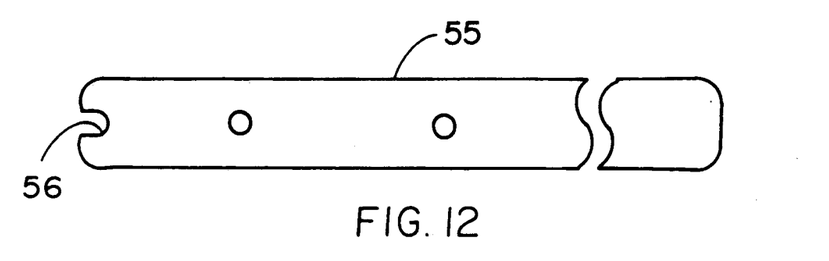
FIG. 12 is a top plan view of a section of the handle of FIG. 10.

Referring to FIG. 10, the components of the detachable leveraged handle 20 are shown. The leveraged handle 20 is a means to engage a workpiece such as the pair of cylinder drive pins 39 and the pair of piston drive pins 47, such that the piston may be reciprocated longitudinally within the cylinder. The handle 20 has a pair of arms 50, 51; each arm has a first end and a second end. The second ends of each arm 50, 51 form respective grips for the arms 50, 51. The arms 50, 51 are joined near their respective first ends by a pin 52. The arms 50, 51 may pivot about the pin 52 in a scissor-like movement. The first end of each arm is bifurcated having a first edge 53 and a second edge 54. As shown in FIG. 10, each arm if formed by adjoining two identical sections 55. A top view and a side view of the section 55 is shown in FIGS. 11 and 12. The first end of each section is shown having an offset portion 57 to form the bifurcated end. To form the one arm 51, the sections are immediately adjacent to one another. To form the other arm 52, the sections 55 are spaced apart and the one arm 51 is disposed in the space formed therebetween. Other means of assembling the arms may be used as are known to persons skilled in the art. The assembly shown provides a simple, inexpensive means of providing a rugged handle with easily formed bifurcated ends since each section 55 forms one component of the bifurcated end of the arm. The first edge 53 is spaced apart from the second edge 54 of each end of the respective arms 51, 52 such that the pump means 15 may be received therein between the edges of the ends of the arms. Further, each edge 53, 54 of each end has a notch 56 formed thereon. When the pump mean 15 is received between the respective edges 53, 54 of the respective ends of the arms 50, 51, the cylinder drive pins 39 are received in the notches 56 in the edge of one arm and the piston drive pins 47 are received in the notches 56 of the other arm. In this manner, when the arm 50, 51 of the leveraged handle 20 are pivoted, the piston 18 is moved within the cylinder 17.

Figures 13, 14:
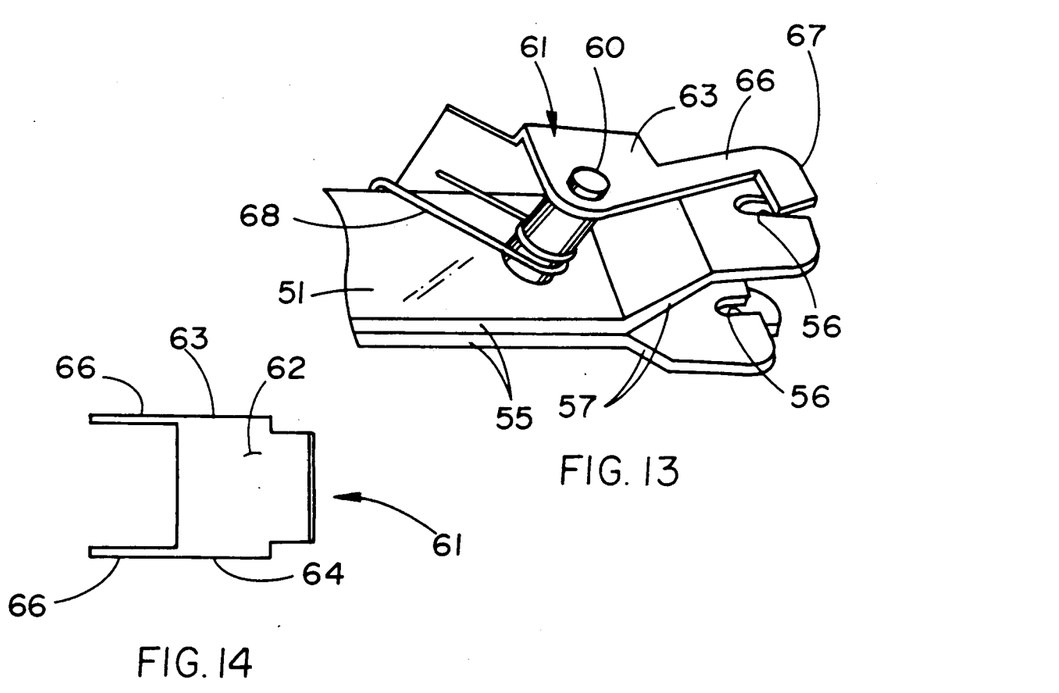
FIG. 13 is a perspective view of one end of the handle of FIG. 10 showing the bracket mounted thereon.
FIG. 14 is a top plan view of the bracket of FIG. 13.
Figure 15:
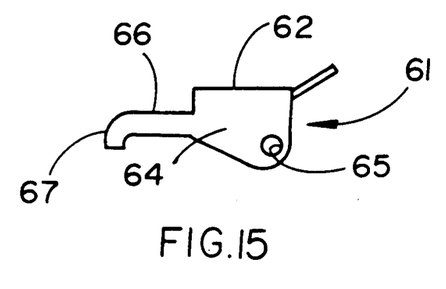
FIG. 15 is a side elevational view of the bracket of FIG. 13.
Figure 16:
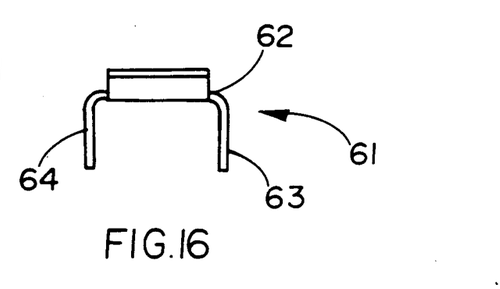
FIG. 16 is a end view of the bracket of FIG. 13.

The first end of each arm 50, 51 further have thereon means for locking the respective pin drives 39, 47 thereon to prevent disengagement when the piston 18 is being reciprocated in the cylinder 17. A pin means 60 extends substantially perpendicularly outwardly from a first side and from an opposite second side of each respective arm 50, 51 (FIG. 13). The pin means 60 is attached near the bifurcated end of each respective arm. A pair of U-shaped brackets 61 are provided for each arm 50, 51 (FIGS. 14–16). Each bracket 61 has a base 62, a first leg 63 and a second leg 64. Each leg 63, 64 further has an opening 65 therein such that when the bracket 61 is disposed on a respective arm 50, 51, the legs 63, 64 of the bracket 61, straddle the respective arms 50, 51. The pin means 60 is received in the respective openings 65 so that the bracket 61 may pivot about the pin means 60. The brackets 61 are mounted on the respective arms such that the base of each bracket 62 faces outwardly from each arm. When so mounted, each bracket 61 may pivot freely without contacting the other arm. Each leg 63, 64 of each bracket 61, further has a hook-shaped member 66 having an end with a hook 67 thereon, extending toward the bifurcated end of the respective arm 50, 51. When the respective bracket 61 is pivoted, the hook end 67 may extend over the notch 56 on the edge of the respective arm. In this manner, the respective drive pin 39, 47 is secured in the respective notch 56 and disengagement is prevented. A spring 68 is connected to each bracket 61 such that each bracket 61 is urged to a first pivotal position whereby the hook end 67 is normally disposed to close the notch 56. In order to open the notch 56, the bracket 61 may be pivoted to a second pivotal position against the urging of the spring 68.

Figure 17:
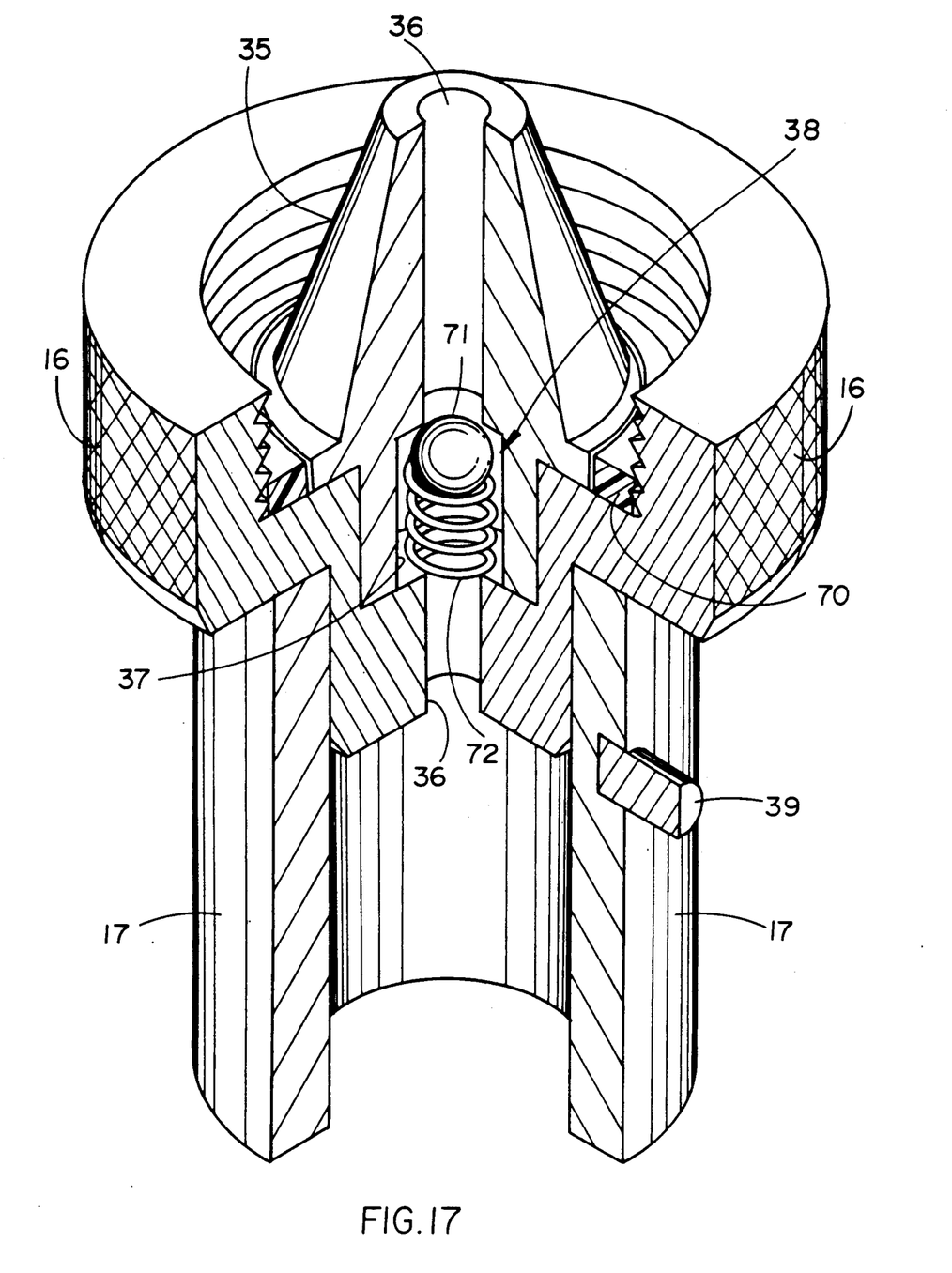
FIG. 17 is a perspective cross-sectional view of the first end of the cylinder of the present invention showing the cap and protruding end thereon.

FIG. 17 more clearly shows the end of the pump means 15 which is coupled to the bag 11. The cylinder cap 16 is received in the cylinder 18 and the protruding end 35 is received in the cap 16 so that the bore 36 permits flow of lubricant L therethrough. A gasket 70 is fitted into the cap 16 to assure an air tight seal between the cylinder cap 16 and the cap 12 on the bag 11. The first passage means 38 includes a check ball 72 and a spring.

Figure 18:
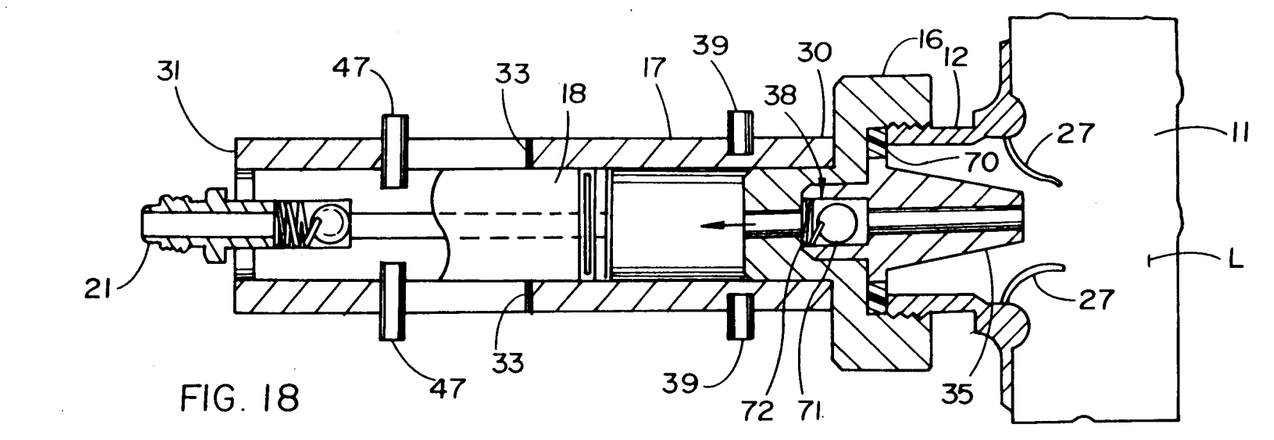
FIGS. 18 and 19 are side elevational views in cross section of the pump means and the container of the present invention showing operation of the piston within the cylinder to pass lubricant from the container and through the pump means.

In order to load the lubricant L into the dispensing means, the cylinder cap 16 is coupled to the bag cap 12 so that the protruding end 35 interrupts the seal 27. The piston 18 is disposed toward the first end 30 of the cylinder 17. This disposition is indicated by the piston drive pins 47 being visible extending from the slot 33 at the end toward the first end 30 of the cylinder 17 (i.e., the container end). The detachable leveraged handle 20 is engaged with the pump means 15 so that the cylinder drive pins 39 and the piston drive pins 47 are secured in the notches 56 in the arms 50, 51 of the leveraged handle by the hook end 67 on the bracket 61. The arms 50, 51 of the leverage handle 20 are pivoted to an opened position and the piston 18 is moved in the cylinder 17 toward the second end 31 of the cylinder. As the piston 18 moves, the lubricant L is drawn from the bag 11 through the first passage means 38. The check ball 71 presses against the spring 72 to permit the lubricant to enter the cylinder (as shown by the arrow in FIG. 18). When the piston 18 has moved longitudinally in the cylinder 17 until movement is prevented by the piston drive pins 47 contacting the end of the slot 33 toward the second end 31 of the cylinder 17, the check ball 71 is urged by the spring 72 to close the first passageway means 38. Due to the extent of longitudinal movement of the piston 18 within the cylinder 17 and the cross-sectional area of the cylinder, it is possible to control the volume of lubricant drawn from the bag 11 and contained in the cylinder 17. Preferably, a volume of approximately one-half ($\frac{1}{2}$) ounce of lubricant may be contained in the cylinder and delivered to the air conditioning system with one stroke of the piston 18. However, by varying the length of the slots 33 and/or the diameter of the cylinder 17, a desired volume of lubricant can be provided.

Figure 19:
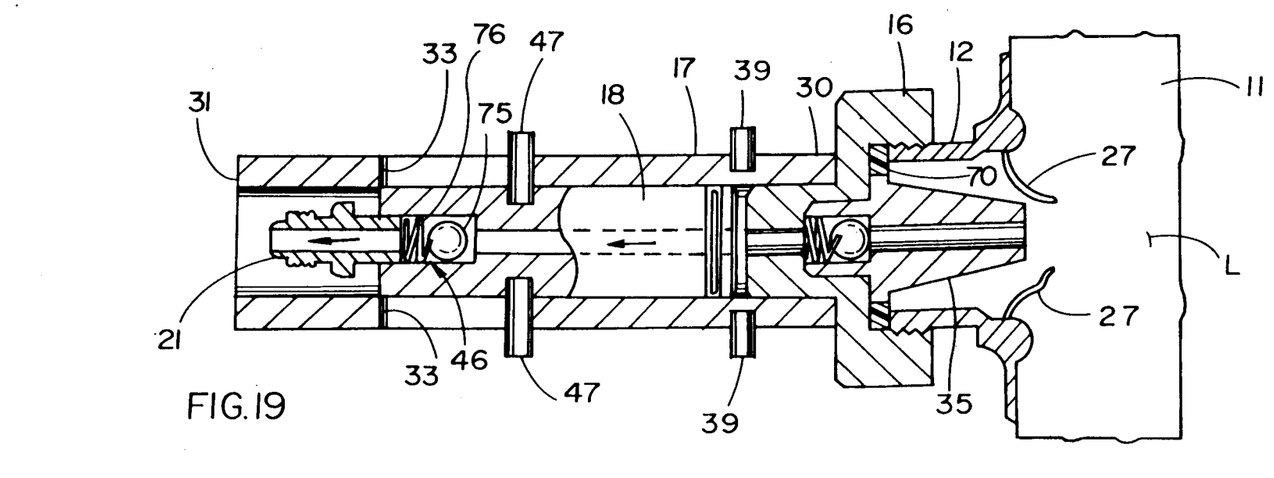

As shown in FIG. 19, when the arms 50, 51 of the leveraged handle 20 are pivoted to a closed position, the piston 18 is moved in the cylinder 17 to a position toward the first end 30 of the cylinder 17 as indicated by the piston drive pins 47 being disposed toward the first end 30 of the slot 33 (i.e., toward the bag 11). When the piston 18 is so moved, the lubricant L is forced through the bore in the cylinder and against the check ball in the second passage means 46 (as shown by the arrow in FIG. 19). The lubricant L passes into the flare fitting 21 and the hose 24 and to the air conditioning system. When the piston 18 is moved until the drive pins 47 are in contact with the end of the slots 33 toward the first end 30 of the cylinder 11, and the piston 18 cannot move any further, the spring 75 in the second passage means 46 urges the check ball 76 to close the passageway. In this manner, the lubricant L is pumped from the cylinder 17 and into the air conditioning system.

In another embodiment, a set of lubricant apparatuses are provided. The set has a plurality of members, each member of the set being used for a different designated lubricant which is used separately from the other members of the set. Each member of the set comprises a respective container such as a collapsible bag for the designated lubricant. Each container has a seal thereon such that the lubricant is not exposed to the atmosphere and cannot absorb moisture from the atmosphere. A respective pump means is provided for each member of the set. Each pump means includes a cylinder having a reciprocating piston therein. Means are provided for connecting the pump means to the air conditioning system. Means are also provided for coupling the cylinder of the pump means to the respective container for lubricant. The latter coupling means includes means for interrupting the seal on the respective container when the respective cylinder is coupled to the respective container. Means externally of each pump means are provided the reciprocating the respective piston in the respective cylinder such that the respective pump means may dispense a measured amount of the designated lubricant to the air conditioning system. The means externally of each pump means may be a single means which ma be used with all of the members of the set. Means are provided for keying the respective container of each member of the set to the respective cylinder of said member such that a cylinder used with a respective designated lubricant is not inadvertently used with a container for another designated lubricant and vice-versa. The keying means may be a threaded cap on the container and a cooperating threaded end on the pump means wherein the threaded members of each set are distinctive from the threaded members of the other sets such that interchangeability of containers and pump mean between sets is prevented. Other keying means known to persons skilled in the art may be used. This prevents contamination of the lubricant by non-intended additives and prevents consequent costly failures of the air conditioning system.

The present invention has been described for use with an air conditioning system but the apparatus may be used for other applications where isolation of liquid from the atmosphere and prevention of mixing of materials is an important consideration.

Accordingly, it will be appreciated that the present invention discloses a container with a seal, a pump means which is coupled to the container by a keying means and when so coupled, interrupts the seal, a pump means having a reciprocating piston which can be reciprocated by means external of the pump means to dispense a known amount of lubricant and means to prevent intermixing of non-compatible materials. This invention readily achieves its objectives.

Obviously, many modifications may be made without departing from the basic spirit of the present invention. For example, in certain applications a portable container of the oil (such as the collapsible bag disclosed herein) may be substituted for by a remote reservoir of oil which, for example, may comprise a large stationary container or tank connected by a hose to the pump means for the present invention. Accordingly, it will be appreciated by those skilled in the art that within the scope of the appended claims, the invention may be practiced other than has been specifically described herein.

What is claimed is:

1. An apparatus for dispensing a measured amount of lubricant into an air conditioning system or the like, wherein the lubricant is substantially hydroscopic and tends to absorb moisture which, if introduced into the refrigerant, would cause premature failure of the air conditioning system, and wherein the lubricant contains additives which may substantially contaminate other additive-containing lubricants intended for refrigerant purposes, the apparatus comprising a container for the lubricant, the container having a seal thereon, such that the lubricant is not exposed to the atmosphere and thus cannot absorb moisture from the atmosphere, a pump means including a cylinder having a reciprocatory piston therein, means for connecting the pump means to the air conditioning system, means for coupling the cylinder to the container, said last-named coupling means including means for interrupting the seal upon coupling the cylinder to the container, means externally of the pump means for reciprocating the piston so that stroking the pump means draws a measured amount of the lubricant from the container and dispenses said lubricant into the air conditioning system, thereby retaining the lubricant in a closed system and preventing inadvertent absorption of moisture by the lubricant or contamination of the lubricant by non-intended additives, and hence into the refrigerant, and thereby preventing a consequent costly failure of the air conditioning system.

2. An apparatus for dispensing a measured amount of lubricant into an air conditioning system or the like, wherein the lubricant is substantially hydroscopic and tends to absorb moisture which, if introduced into the refrigerant, would cause premature failure of the air conditioning system, and wherein the lubricant contains additives which may substantially contaminate other additive-containing lubricants intended for refrigerant purposes, the apparatus comprising a container for the lubricant, the container having a seal thereon, such that the lubricant is not exposed to the atmosphere and thus cannot absorb moisture from the atmosphere, a pump means including a cylinder having a reciprocatory piston therein, means for connecting the pump means to the air conditioning system, means for coupling the cylinder to the container, said last-named coupling means including means for interrupting the seal upon coupling the cylinder to the container, means externally of the pump means for reciprocating the piston so that the pump means will dispense a measured amount of the lubricant into the air conditioning system, thereby preventing inadvertent absorption of moisture by the lubricant or contamination of the lubricant by non-intended additives, and hence into the refrigerant, and thereby preventing a consequent costly failure of the air conditioning system; the cylinder having a first end, a second end and a midpoint, a pair of slots extending longitudinally on the cylinder from approximately the midpoint toward the second end thereof, the slots being on diametrically opposed side of the cylinder, the first end of the cylinder having thereon sealing means for coupling to the container, the first end of the cylinder further having therein first passage means for permitting the lubricant to pass from the container into the cylinder; the second end of the cylinder being oriented toward the air conditioning system, a reciprocatory piston received within the cylinder; the piston having a longitudinal bore therethrough such that lubricant may pass from the first end of the cylinder, through the bore in the piston and to the air conditioning system; means for connecting the piston to the air conditioning system, the connecting means having therein second passage means for permitting lubricant to pass from the piston to the air conditioning system; the piston having at least one sealant means thereabout such that a seal is made between the piston and the cylinder; the piston having a mid point, a pair of drive pins attached to piston at approximately the midpoint thereof, the drive pins extending outwardly from the piston, each drive pin being attached on diametrically opposed sides of the piston such that when the piston is received in the cylinder, the drive pins on the piston communicate with the respective longitudinal slots in the cylinder, the drive pins on the piston extending outwardly through said respective slots such that when the piston reciprocates longitudinally within the cylinder, the longitudinal movement is limited by the drive pins on the piston extending from the longitudinal slots; and means for reciprocating the piston within the cylinder.

3. The apparatus of claim 2, further comprising a pair of drive pins attached near the first end of the cylinder, each drive pin being attached on diametrically opposed sides of the cylinder, each drive pin extending perpendicularly outwardly from the cylinder, each drive pin being on a respective longitudinal plane which corresponds with a longitudinal plane for each longitudinal slot such that the pair of cylinder attached drive pins are longitudinally aligned with the pair of longitudinal slots in the cylinder.

4. The apparatus of claim 3, wherein the means externally of the pump means is a leveraged handle means to engage the pair of cylinder drive pins and the pair of piston drive pins such that the piston may be reciprocated longitudinally within the cylinder by movement of the leveraged handle means.

5. The apparatus of claim 4, further comprising the leveraged handle having a pair of arms, each arm having a first end and a second end, the arms being joined near the respective first ends by a pin for pivotal movement of the arms about the pin in a scissor-like movement, the second ends of the respective arms forming respective grips, the first end of each arm being a bifurcated end, each bifurcated end having a first edge and a second edge, each first edge being spaced apart from each second edge such that the pump means may be received between the respective edges of the respective bifurcated ends; each first edge and each second edge further having a notch formed therein such that when the pump means is received between the respective edges of the respective bifurcated ends of the arms, the pin drives attached to the cylinder being received in the notches in the edges of the one bifurcated end and the pin driver attached to the piston being received in the notches in the edges of the other bifurcated end, thereby permitting movement of the piston within the cylinder when the arms of the leveraged handle are pivoted; and the first end of each arm further having thereon means for locking the respective pin drives in the respective notches to prevent disengagement thereof when the piston is being reciprocated longitudinally in the cylinder.

6. The apparatus of claim 5, wherein the means for locking the respective pin drives in the respective notches comprises pin means extending substantially perpendicularly outwardly from a first side and from an opposite second side of each respective arm, the pin means being attached near the bifurcated end of each respective arm; a pair of U-shaped brackets, each having a base, a first leg and a second leg thereon, each leg having an opening therein, each U-shaped bracket disposed on each respective arm such that the legs of each bracket straddle each respective arm, the pin means on the first side and on the second side of the respective arm being received in the respective openings on the first leg and on the second leg of the respective bracket whereby the respective bracket may pivot thereabout, the base of the bracket facing outwardly from each arm such that the respective bracket may freely pivot without contacting the other arm; each leg of each bracket further having a hook-shaped member having an end with a hook thereon, the hook-shaped member extending toward the bifurcated end of the respective arm such that when the respective bracket is pivoted, the hook end may extend over the respective notch on the edge of the respective arm, thereby securing the respective pin in the respective notch preventing disengagement of the respective pin from the respective notch; a pair of springs, one spring attached to each bracket such that each bracket is urged to a first pivotal position, whereby the respective hook end on the respective bracket is disposed to close the respective notch and, whereby the respective bracket may be moved to a second pivotal position such that the respective hook end may be removed from the respective notch.

7. The apparatus of claim 2, wherein the means for connecting the pump means to the air conditioning system comprises the piston having an end oriented toward the second end of the cylinder; a flare fitting attached to the end of the piston; a hose having a first end and a second end, the first end of the hose having a first coupling means attached thereto, the first coupling means being connected to the flare fitting, the second end of the hose having a second coupling means thereon, the second coupling means being connected to the air conditioning system.

8. The apparatus of claim 2, wherein the means for connecting the pump means to the air conditioning means comprises a flare fitting attached to the second end of the cylinder, the flare fitting having a bore therein, said bore communicating with the bore in the piston such that lubricant may pass therethrough; a hose having a first end and a second end, the first end of the hose having a first coupling means attached thereto, the second end of the hose having a second coupling means thereon, the second coupling means being connected to the air conditioning system.

9. The apparatus of claim 4, wherein longitudinal movement of the piston within the cylinder may be controlled to deliver a desired quantity of lubricant.

10. The apparatus of claim 9, wherein approximately one-half ounce of lubricant may be delivered with one cycle of the piston.

11. The apparatus of claim 2, wherein the piston has at least one groove thereabout, the groove having a base and a pair of side walls; a "T" shaped member being disposed in the groove such that a flange member of the "T" member is oriented toward the base of the groove and a center leg of the "T" extends outwardly in the groove; a pair of back-up rings, one being disposed on each side of the center leg of the "T" member, each back-up ring being between the center leg of the "T" member and the respective walls of the groove such that the "T" member and the back-up rings provide a sealant means between the piston and the cylinder.

12. An apparatus for dispensing a measured amount of lubricant into an air conditioning system or the like, wherein the lubricant is substantially hydroscopic and tends to absorb moisture which, if introduced into the refrigerant, would cause premature failure of the air conditioning system, and wherein the lubricant contains additives which may substantially contaminate other additive-containing lubricants intended for refrigerant purposes, the apparatus comprising a container for the lubricant, the container having a seal thereon, such that the lubricant is not exposed to the atmosphere and thus cannot absorb moisture from the atmosphere, a pump means including a cylinder having a reciprocatory piston therein, means for connecting the pump means to the air conditioning system, means for coupling the cylinder to the container, said last-named coupling means including means for interrupting the seal upon coupling the cylinder to the container, means externally of the pump means for reciprocating the piston so that the pump means will dispense a measured amount of the lubricant into the air conditioning system, thereby preventing inadvertent absorption of moisture by the lubricant or contamination of the lubricant by non-intended additives, and hence into the refrigerant, and thereby preventing a consequent costly failure of the air conditioning system; the container having a threaded cap thereon, the cap having the seal therein; the pump means having a cooperating threaded end thereon, such that the pump means may be keyed to the container to align the pump means with the seal on the container; and the pump means further having a protruding end within the threaded end, the protruding end extending outwardly from the threaded end such that when the pump means is threadably engaged to the threaded cap on the container, the protruding end of the pump means may interrupt the seal within the cap of the container thereby permitting lubricant from the container to enter the pump means.

13. The apparatus of claim 12, wherein the apparatus comprises a plurality of containers and a plurality of pump means, each container having a corresponding pump means to form a set, each set having a threaded cap on the respective container and a cooperating threaded end on the respective pump means, said cooperating threaded cap and threaded end of each set being distinctive from the other sets and such that interchangeability of containers and pump means between sets is prevented.

14. The apparatus of claim 1, wherein the container is a collapsible bag.

15. The apparatus of claim 14, wherein the container is fabricated of a material such that the lubricant in the bag is visible for inspection.

16. An apparatus for dispensing a measured amount of lubricant into an air conditioning system or the like, wherein the lubricant is substantially hydroscopic and tends to absorb moisture which, if introduced into the refrigerant, would cause premature failure of the air conditioning system, and wherein the lubricant contains additives which may substantially contaminate other additive-containing lubricants intended for refrigerant purposes, the apparatus comprising a collapsible container for the lubricant, the container having a seal thereon, such that the lubricant is not exposed to the atmosphere and thus cannot absorb moisture from the atmosphere; a dispensing means, the dispensing means including a cylinder having a reciprocating piston therein; means for keying the container to the dispensing means such that the lubricant is not exposed to the atmosphere; means for interrupting the seal on the container permitting the lubricant to enter the dispensing means, and means for connecting the dispensing means to the air conditioning system.

17. The apparatus of claim 16, wherein the dispensing means has a protrusion thereon such that when the dispensing means is keyed to the container, the protrusion interrupts the seal on the container.

18. The apparatus of claim 16, wherein the container has a threaded cap thereon, the cap having a seal therein; the dispensing means having a cooperating threaded end thereon such that the container may be keyed to the dispensing means thereby aligning the dispensing means with the seal on the container; the dispensing means having a seal interrupting means thereon such that when the dispensing means is threadably coupled to the cap on the container, the seal is interrupted.

19. The apparatus of claim 16, wherein the container is fabricated of a material such that the lubricant in the container is visible for inspection.

20. An apparatus for dispensing a measured amount of lubricant into an air conditioning system or the like, wherein the lubricant is substantially hydroscopic and tends to absorb moisture which, if introduced into the refrigerant, would cause premature failure of the air conditioning system, and wherein the lubricant contains additives which may substantially contaminate other additive-containing lubricants intended for refrigerant purposes, the apparatus comprising a container for the lubricant; a dispensing means connected to the container and means for connecting the dispensing means to the air conditioning system; the dispensing means including a cylinder having a reciprocating piston therein, the piston having a longitudinal bore therethrough such that the lubricant may pass from the container, through the piston and to the air conditioning system; and detachable means externally of the cylinder for reciprocating the piston within the cylinder.

21. The apparatus of claim 20, further comprising the cylinder having a first end connected to the container and a second end oriented toward the air conditioning system; the first end having therein a first passage means for permitting the lubricant to pass from the container into the cylinder; means for connecting the dispensing means to the air conditioning system having therein a second passage means for permitting the lubricant to pass from the piston to the air conditioning system; means for reciprocating the piston in the cylinder such that when the piston moves from the first end of the cylinder, toward the second end of the cylinder, the lubricant passes from the container through the first passage means into the cylinder to fill the cylinder with lubricant, the lubricant filling the cylinder from the first end of the cylinder to the piston; and when the piston moves from second end of the cylinder toward the first end of the cylinder, the lubricant within the cylinder passes through the bore in the piston and through the second passage means into the air conditioning system.

22. An apparatus for dispensing a measured amount of lubricant into an air conditioning system or the like, wherein the lubricant is substantially hydroscopic and tends to absorb moisture which, if introduced into the refrigerant, would cause premature failure of the air conditioning system, and wherein the lubricant contains additives which may substantially contaminate other additive-containing lubricants intended for refrigerant purposes, the apparatus comprising a container for the lubricant; a dispensing means connected to the container and means for connecting the dispensing means to the air conditioning system; the dispensing means including a cylinder having a reciprocating piston therein, the piston having a longitudinal bore therethrough such that the lubricant may pass from the container, through the piston and to the air conditioning system; and means for reciprocating the piston within the cylinder; the cylinder having a first end connected to the container, a second end oriented toward the air conditioning system and a midpoint, a pair of slots extending longitudinally on the cylinder from approximately the midpoint toward the second end thereof, the slots being on diametrically opposed sides of the cylinder; the piston having a midpoint, a pair of drive pins attached to the piston at approximately the midpoint thereof, the drive pins extending outwardly from the piston, each drive pin being attached on diametrically opposed sides of the piston such that when the piston is in the cylinder, the drive pins on the piston communicate with the respective longitudinal slots in the cylinder, the drive pins on the cylinder extending outwardly through said slots such that when the piston reciprocates longitudinally, within the cylinder, the longitudinal movement is limited by the drive pins on the piston extending from the longitudinal slots.

23. An apparatus for dispensing a measured amount of fluid from a source of the fluid, the apparatus comprising: a cylinder having a first end, a second end and a midpoint; means for connecting the first end of the cylinder to the source of the fluid; a pair of slots extending longitudinally on the cylinder from approximately the midpoint toward the second end of the cylinder, the slots being on diametrically opposed sides of the cylinder; a reciprocating piston received within the cylinder, the piston having a longitudinal bore therethrough; the first end of the cylinder having a first passage means therein to permit the fluid to pass from the source of the fluid into the cylinder, the longitudinal bore in the piston having a second passage means therein to permit fluid to pass from the piston, such that the fluid may pass from the source of the fluid through the cylinder and through the piston; the piston further having a midpoint, a pair of drive pins attached to the piston at approximately the midpoint thereof; each drive pin being attached on diametrically opposed sides of the piston such that when the piston is received within the cylinder, the drive pins on the piston communicate with the respective longitudinal slots in the cylinder, the drive pins on the piston extending outwardly through the respective longitudinal slots, such that when the piston reciprocates longitudinally within the cylinder, the longitudinal movement is limited by the drive pins on the piston extending from the longitudinal slots and the amount of fluid dispensed is thereby controlled; and means for reciprocating the piston within the cylinder.

24. A detachable leveraged device for holding and moving a workpiece, the workpiece having a plurality of pins attached thereto, the device comprising: a pair of arms, each arm having a first end and a second end, the arms being joined near the respective first ends by a pin for pivotal movement of the arms about the pin in a scissor-like movement; the second ends of the respective arms forming respective handles, the first end of each arm being a bifurcated end, each bifurcated end having a first edge and a second edge, each first edge being spaced apart from each second edge such that the workpiece may be received between the respective edges of the respective bifurcated ends; each first edge and each second edge further having a notch formed therein such that when the workpiece is received between the respective edges of the respective bifurcated ends of the arms, the at least one pin attached to the workpiece is received in the notch in the edge of the one bifurcated end and the at least another pin attached to the workpiece is received in the notch in the edge of the other bifurcated end thereby permitting holding of the workpiece and movement of the workpiece when the arms of the leveraged device are pivoted; and the first end of each arm further having thereon means for locking the respective pins in the respective notches to prevent disengagement thereof when the workpiece is held and moved.

25. The device of claim 24, wherein the means for locking the respective pins in the respective notches comprises a pin means extending substantially perpendicularly outwardly from a first side and from a second side of each respective arm, the pin means being attached near the bifurcated end of each respective arm; a pair of U-shaped brackets, each having a base, a first leg and a second leg thereon, each leg having an opening therein, each U-shaped bracket disposed on each respective arm such that the legs of each bracket straddle each respective arm, the pin means on the first side and on the second side of the respective arm being received in the respective openings on the first leg and on the second leg of the respective bracket whereby the respective bracket may pivot thereabout, the base of the bracket facing outwardly such that the respective bracket may freely pivot without contacting the other arm; each leg of each bracket further having a hook-shaped member having an end with a hook thereon, the hook-shaped member extending toward the bifurcated end of the respective arm such that when the respective bracket is pivoted, the hook end may extend over the respective notch on the edge of the respective arm, thereby securing the respective pin in the respective notch preventing disengagement of the respective pin from the respective notch; a pair of springs, one spring attached to each bracket such that each bracket is urged to a first pivotal position, whereby the respective hook end on the respective bracket is disposed over the respective notch and, whereby the respective bracket may be moved to a second pivotal position such that the respective hook end may be removed from the respective notch.

26. A set of lubricant apparatuses for dispensing a measured amount of lubricant into an air conditioning system or the like, wherein the lubricant is substantially hydroscopic and tends to absorb moisture which, if introduced into the refrigerant, would cause premature failure of the air conditioning system, and wherein the lubricant contains additives which may substantially contaminate other additive-containing lubricants intended for refrigerant purposes, the set having a plurality of members, each member of the set having a different designated lubricant which is used separately from the other members of the set, each member of the set comprising: a respective collapsible container for the designated lubricant, each container having a seal thereon, such that the lubricant is not exposed to the atmosphere and thus cannot absorb moisture from the atmosphere; a respective pump means including a cylinder having a reciprocatory piston therein; means for connecting the respective pump means to the air conditioning system; means for coupling the respective cylinder to the respective container, said last-named coupling means including means for interrupting the respective seal on the respective container upon coupling the respective cylinder to the respective container; means externally of each pump means for reciprocating the respective piston so that the respective pump means will dispense a measured amount of the designated lubricant into the air conditioning system; and means for keying the respective container of each member to the respective cylinder of said member, such that a cylinder used with a respective designated lubricant is not inadvertently used with a container for another designated lubricant, and vice-versa, thereby preventing inadvertent absorption of moisture by the lubricant or contamination of the lubricant by non-intended additives, and thereby preventing a consequent costly failure of the air conditioning system.

27. A method for dispensing a measured amount of lubricant into an air conditioning system or the like comprising the steps of: providing a designated collapsible container for the lubricant having a seal thereon, the container further having means thereon for attaching a designated pump means; providing the designated pump means for attachment to the designated container such that the designated pump means may be attached to only the designated container and such that a designated pump means used with a respective lubricant is not inadvertently used with a designated container for another lubricant and vice-versa; the designated pump means further having a reciprocatory piston therein; attaching said designated pump means to said designated container such that the seal on the designated container is interrupted permitting the respective lubricant to pass from the designated container to the designated pump means; connecting the designated pump means to the air conditioning system; providing a detachable leverage means; and connecting the detachable leverage means to the designated pump means such that the reciprocatory piston in the designated pump means may be reciprocated through a controlled distance thereby dispensing the measured amount of lubricant to the air conditioning system.

* * * * *